C. PARTELLO.
HOOK.
APPLICATION FILED JUNE 29, 1920.
1,399,648.
Patented Dec. 6, 1921.
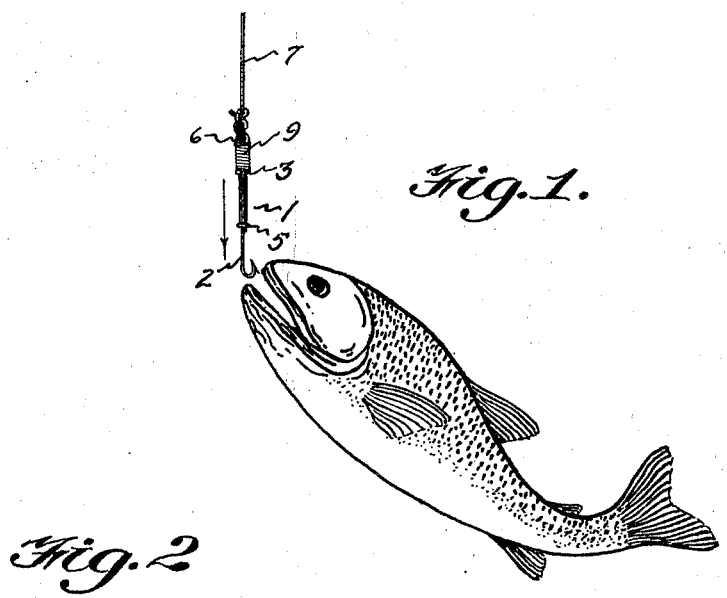
Fig. 1.
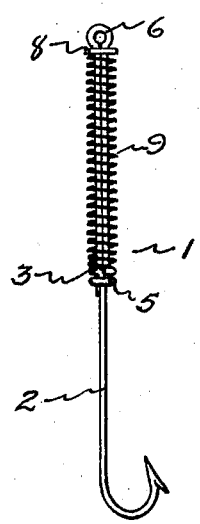
Fig. 2.
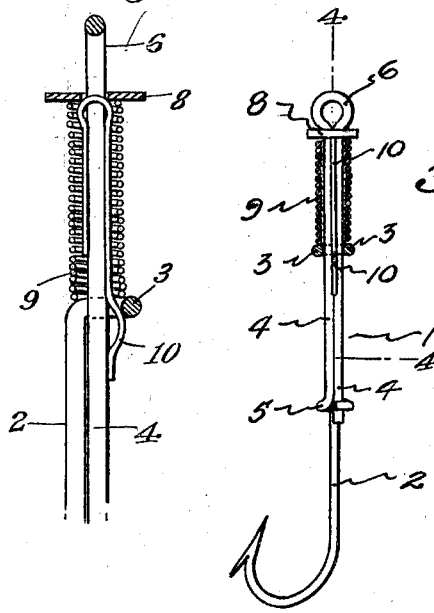
Fig. 4.
Fig. 3.
C. Partello
INVENTOR
BY Victor J. Evans
ATTORNEY
Jos. A. Balster
WITNESS:

1,399,648.

UNITED STATES PATENT OFFICE.

CHARLES PARTELLO, OF LIVERPOOL, NEW YORK.

HOOK.

Specification of Letters Patent. Patented Dec. 6, 1921.

Application filed June 29, 1920. Serial No. 392,700.

*To all whom it may concern:*

Be it known that I, CHARLES PARTELLO, a citizen of the United States, residing at Liverpool, in the county of Onondaga and State of New York, have invented new and useful Improvements in Hooks, of which the following is a specification.

With the ordinary construction of fishing hooks the bait is frequently removed therefrom by the fish nibbling thereat and consequently a great number of fish thus escape the fisher. With the nibble on his hook the fisherman almost invariably draws upon his line so that the hook is entirely withdrawn from the fish's mouth.

It is the object of the present invention to construct a fishing hook whereby, when a fish nibbles at the bait thereof spring influenced means will operate the hook to cause the same to enter the fish's mouth, and thus materially facilitate the fisherman in making the catch.

It is a further object to produce a fishing hook which has slidably associated with the shank thereof a rod to which the line is attached, the said rod having a catch for engaging with the end of the shank for normally holding the shank and hook inward with respect to the rod, the said catch being easily operated so that a fish nibbling on the bait on the hook will release the hook from the rod, while spring means is provided between the hook and rod for forcing the hook away from the rod to cause the barb of the said hook to impinge itself in the mouth of the fish.

The drawings illustrate a satisfactory embodiment of the improvement.

In the drawings—

Figure 1 is a view of the improvement, showing a fish nibbling at the barb end of the hook.

Fig. 2 is a similar view showing the arrangement of parts when the fish has caused the hook to be released from the catch on the rod.

Fig. 3 is an enlarged elevation of the improvement parts being in section.

Fig. 4 is an enlarged detailed sectional view taken on the line 4—4 of Fig. 3.

Referring now to the drawings in detail a fishing hook is broadly indicated by the numeral 1, the hook is provided with a straight somewhat elongated shank 2 that terminates in an off-set eye 3. On one side of the shank 2 and passing through the eye thereof is a rod 4 this rod if desired may be formed from a single strand of wire which is centrally bent upon itself to provide parallel legs between which the shank 2 rests.

The inner end of the rod is provided with an offset eye 5 that surrounds the shank 2, and the outer or looped end 6 of the rod has the fishing line 7 secured thereto.

On the rod and contacting with the loop 6 is a plate or disk 8. Surrounding the rod and exerting a pressure between the disk 8 and the eye 3 of the shank 2 is a light helical spring 9.

On the rod, a suitable distance inward of the disk 8 there is a light spring catch 10 which is designed to engage the eye 3 of the shank 2 when the shank is moved toward the outer or looped end of the rod and the spring is compressed between the eye of the shank and the disk 8.

The line 7 is retained substantially taut. A fish nibbling on the bait on the barb end of the hook 1 will on the slightest contact of the said hook release the catch 10 which will cause the hook to travel in the direction of the arrow in Fig. 1 of the drawings, incident to the expansion of the spring 9, and thus the barbed end of the said hook will embed itself in the mouth of the fish.

It is thought that the foregoing description when taken in connection with the drawings will fully set forth the construction and advantages of the invention.

What I claim is:—

A device of the class described comprising a hook provided with a straight elongated shank terminating in an off-set eye, a guide rod formed from a single strand of wire, bent upon itself to provide a loop, extending through the off-set eye of said hook and terminating in an off-set eye surrounding the shank of said hook, a disk mounted on said rod and engaging said loop and a spring catch secured to said rod, passing through said loop and adapted to engage the offset eye of said hook.

In testimony whereof I affix my signature.

CHARLES PARTELLO.